United States Patent
Qi et al.

(10) Patent No.: US 11,790,516 B1
(45) Date of Patent: Oct. 17, 2023

(54) METHOD AND SYSTEM FOR MONITORING GIS INSTRUMENT SULFUR HEXAFLUORIDE DATA BASED ON EDGE COMPUTING

(71) Applicant: HANGZHOU YUANJIAN INFORMATION TECHNOLOGY CO., LTD, Hangzhou (CN)

(72) Inventors: Donglian Qi, Hangzhou (CN); Yunfeng Yan, Hangzhou (CN)

(73) Assignee: HANGZHOU YUANJIAN INFORMATION TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/197,127

(22) Filed: May 15, 2023

(30) Foreign Application Priority Data

Nov. 9, 2022 (CN) .......................... 202211395908.8

(51) Int. Cl.
    *G06T 7/11* (2017.01)
    *G06T 7/00* (2017.01)
    (Continued)

(52) U.S. Cl.
    CPC ............ *G06T 7/0004* (2013.01); *G06T 5/006* (2013.01); *G06T 7/11* (2017.01); *G06T 7/60* (2013.01);
    (Continued)

(58) Field of Classification Search
    CPC .. G01N 9/266; G01R 31/327; G01R 31/3271; G05B 15/02; G01M 3/002; G01M 3/26
    (Continued)

(56) References Cited

U.S. PATENT DOCUMENTS

2021/0216862 A1    7/2021    Liu et al.

FOREIGN PATENT DOCUMENTS

| CN | 106338475 A | * | 1/2017 | ............ G01N 21/27 |
| CN | 111046826 A | | 4/2020 | |

(Continued)

OTHER PUBLICATIONS

Xu Fabing, et al., Research on pointer instrument detection and recognition based on deep learning, High-Technology Newsletter, 2019, pp. 1206-1215, vol. 29, Issue 12.

(Continued)

*Primary Examiner* — Masum Billah
(74) *Attorney, Agent, or Firm* — Bayramoglu Law Offices LLC

(57) ABSTRACT

A method and a system for monitoring GIS instrument sulfur hexafluoride data based on edge computing are provided. The method includes the following specific steps: acquiring an instrument image; preprocessing the instrument image based on a generative adversarial network to obtain a first image; establishing a keypoint detection model to perform instrument reading on the first image to obtain reading data; and sending the reading data to a power supply system scheduling background, storing the data and performing early warning operation according to the reading data. The method and the system achieve the uninterrupted acquisition, analysis and processing, information transmission and information management of the real-time information of the GIS combined switch density meter, and develop a GIS instrument $SF_6$ data intelligent monitoring terminal with functions such as real-time analog information measurement and digitization, digital information transmission and display, and early warning signal reminding and reviewing.

13 Claims, 4 Drawing Sheets

(51) Int. Cl.
*G06T 5/00* (2006.01)
*H04N 7/18* (2006.01)
*G06T 7/60* (2017.01)

(52) U.S. Cl.
CPC ... *H04N 7/183* (2013.01); *G06T 2207/20081* (2013.01); *G06T 2207/20084* (2013.01); *G06T 2207/30164* (2013.01)

(58) Field of Classification Search
USPC ........................................................ 348/160
See application file for complete search history.

(56) References Cited

FOREIGN PATENT DOCUMENTS

| CN | 111223057 A | | 6/2020 |
|---|---|---|---|
| CN | 112257609 A | | 1/2021 |
| CN | 115019294 A | * | 9/2022 |
| CN | 115035364 A | | 9/2022 |

OTHER PUBLICATIONS

Liyuan Li, et al., Attention Mechanism Cloud Detection with Modified FCN for Infrared Remote Sensing Images, IEEE Access, 2021, pp. 1-9, vol. XX.

Li Pei-Ling, et al., Automatic System of Detecting Analog Measuring Instruments Based on Digital Image Processing Technology, Information and Electronic Engineering, 2006, pp. 145-148, vol. 4, No. 2.

Liu Jinqing, et al., Novel method of Automatic Recognition for Analog Measuring Instruments, International Conference on Manufacturing Science and Engineering (ICMSE 2015), 2015, pp. 67-75, Atlantis Press.

Li Zhiwei, et al., Study on a new recognition method of pointer meters, Sensors and Instrumentation, 2007, pp. 113-114, 126, vol. 23, No. 11-1, Article ID:1008-0570.

* cited by examiner

METHOD AND SYSTEM FOR MONITORING GIS INSTRUMENT SULFUR HEXAFLUORIDE DATA BASED ON EDGE COMPUTING

CROSS REFERENCE TO THE RELATED APPLICATIONS

This application is based upon and claims priority to Chinese Patent Application No. 202211395908.8, filed on Nov. 9, 2022, the entire contents of which are incorporated herein by reference.

TECHNICAL FIELD

The present invention relates to the technical field of Gas-insulated switchgear (GIS) equipment monitoring, and in particular to a method and a system for monitoring GIS instrument sulfur hexafluoride data based on edge computing.

BACKGROUND

With the continuous development of science and technology, a large amount of work has been carried out on the automatic reading of $SF_6$ pointer instruments in substations, and certain results have been achieved. In 2006, Li Peiling et al. performed thresholding processing on an instrument image to obtain a connected region, used a central point of a connected region of a thick pointer to represent a pointer position, performed fitting by the property that the distances from a central point of a tail part of a pointer to a rotation center of the pointer are equal in all images to obtain coordinates of the rotation center, thereby determining a line of the pointer, and then fitted a triangle to calculate the pointer reading of a dial according to the coordinates of the central point of the pointer, the coordinates of the rotation center and the coordinates of a zero-scale point; and in 2015, Liu Jinqing et al. segmented a range of a region where the pointer is located by a region growing method, obtained a connected region where the pointer is located by hit-miss transformation or a least square method, and refined the pointer region into a line to calculate a deflection angle. In addition, Li Zhiwei et al. proposed maximum gray level subtraction in order to obtain a background image without a pointer. In the aspect of image preprocessing, scholars propose that images are preprocessed in advance with a homomorphic filtering method and a Retinex image enhancement method, so that the influence of part of environmental interference such as uneven illumination on instrument reading can be solved.

In summary, the domestic technical researches in reading dynamic data of the instrument, performing application analysis according to the running characteristics of the equipment, and generating corresponding data information and transmitting the data information to the background are limited to robot monitoring and mobile environment monitoring, and there are the following problems in theses schemes:

(1) since the positions of the instrument devices are different (some instruments cannot be read by robot monitoring and mobile environmental monitoring), there is a defect in the real-time data reading of the instruments;

(2) since the monitoring equipment is moved at regular intervals, there is a time difference in reading the real-time data of the instruments; and (3) there is a reading error due to factors such as viewing angle.

Therefore, it is an urgent problem to be solved for those skilled in the art to improve the timeliness and comprehensiveness of $SF_6$ meter data monitoring and fault alarming of GIS equipment in substations.

SUMMARY

In view of this, the present invention provides a method and a system for monitoring GIS instrument sulfur hexafluoride data based on edge computing, so as to solve the problems in the background art.

In order to achieve the above purpose, the present invention adopts the following technical solutions: a method for monitoring GIS instrument $SF_6$ data based on edge computing includes the following specific steps:

acquiring an instrument image;

preprocessing the instrument image based on a generative adversarial network to obtain a first image;

establishing a keypoint detection model to perform instrument reading on the first image to obtain reading data; and sending the reading data to a power supply system scheduling background, storing the data and performing early warning operation according to the reading data.

Optionally, the generative adversarial network includes a generator and a discriminator; the generator is a 19-layer fully convolutional network that includes a convolution layer and a deconvolution layer, up and down sampling is performed through a step length of the convolution layer and the deconvolution layer, and LeakyReLU is used as an activation function.

Optionally, in the generator, a feature map is extracted by a convolution kernel of 7×7 and a residual convolution module, a channel attention module is added, the feature map is processed by global average pooling, and then a weight obtained by a full connection layer is multiplied by a feature map outputted by the network.

Optionally, the performing instrument reading on the first image by the keypoint detection model includes the following steps:

selecting a specific scale and a pointer position in the instrument image for calibration;

converting keypoint coordinates of a labeled pointer instrument image into a corresponding heat map label by a Gaussian kernel function; and establishing an improved Fully Convolutional Networks (FCN) keypoint detection model by combining the heat map label and a fully convolutional network structure, and detecting an input image.

Optionally, perspective transformation correction is performed by a known keypoint for a distorted instrument image; and normal projection is performed on the corrected pointer instrument dial image based on the known keypoint, so that a circular dial becomes a rectangular dial region with uniform scales, and reading calculation is performed according to known position coordinates of a pointer.

Optionally, training the keypoint detection model includes the following steps:

acquiring an instrument image, randomly extracting a plurality of images for manual labeling, dividing the images into labeled data and unlabeled data, and gradually weakening a supervised signal of the labeled data by a supervised loss function of an annealing algorithm, wherein the supervised loss function is:

$$L_{sup} = \frac{1}{|D_l|} \sum_{x_i^l, y_i \in D_l} \{f(x_i^l) < \tau\}_1 H(f(x_i^l), y_i);$$

performing segmentation mask on the labeled data and the unlabeled data, and extracting information of a dial center, a dial and a pointer; and performing reading according to the information of the dial center, the dial and the pointer.

Optionally, point fitting is performed on the dial center, and for a scale center, center coordinates of all pixel points in a region to which the scale center belongs are calculated to obtain a geometric center point; ellipse fitting is performed on the dial to fit into an ellipse according to all pixel point coordinates in a region to which the dial belongs, and an intersection of the ellipse and an original region is retained as a scale fitting result; and line fitting is performed on the pointer to fit into a line by a least square method.

In another aspect, provided is a system for monitoring GIS instrument $SF_6$ data based on edge computing, wherein the system monitors by adopting the method for monitoring GIS instrument $SF_6$ data based on edge computing for monitoring, and includes an intelligent monitoring device, a communication device and an integration server which are sequentially connected;

wherein the intelligent monitoring device is configured to monitor GIS instrument $SF_6$ data based on edge computing to obtain monitoring data;

the communication device is configured to transmit the monitoring data to the integration server in real time; and the integration server is configured to receive the monitoring data, store the monitoring data and perform early warning according to the monitoring data.

Optionally, the intelligent monitoring device includes a camera module, an edge computing chip module, a storage module, a network transmission module and a display module; the camera module, the storage module, the network transmission module and the display module are all connected with the edge computing chip module; and the camera module is configured to photograph an instrument image, the edge computing chip module is configured to perform image processing on the instrument image to obtain reading data, the storage module is configured to store the reading data, the network transmission module is configured to transmit the reading data to the communication device, and the display module is configured to display the reading data.

It can be seen from the above technical solutions, compared with the prior art, the method and the system for monitoring GIS instrument sulfur hexafluoride data based on edge computing provided by the present invention have the following beneficial technical effects: the uninterrupted acquisition, analysis and processing, information transmission and information management of the real-time information of the GIS combined switch density meter are achieved, a GIS instrument $SF_6$ data intelligent monitoring terminal with functions such as real-time analog information measurement and digitization, digital information transmission and display, and early warning signal reminding and reviewing is developed, and the functions of real-time information acquisition, information analog-to-digital conversion, real-time information night vision, real-time data analysis, information data storage (export), digital or picture information uploading and the like are centrally achieved, thereby meeting the monitoring requirements of department of power supply operation and maintenance on the real-time state of the GIS combined switch density meter, effectively improving the timeliness and comprehensiveness of $SF_6$ meter data monitoring and fault alarming of GIS equipment in substations, and having an important promotion effect on improving the reliability and safety of a power system.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are merely embodiments of the present invention, and those of ordinary skilled in the art can obtain other drawings according to the drawings provided without creative efforts.

DETAILED DESCRIPTION OF THE EMBODIMENTS

The technical solutions in the embodiments of the present invention will be clearly and completely described below with reference to the drawings in the embodiments of the present invention. It is obvious that the described embodiments are only part of the embodiments of the present invention rather than all of the embodiments. Based on the embodiments of the present invention, all other embodiments obtained by those of ordinary skilled in the art without creative efforts shall fall within the protection scope of the present invention.

Figure 1:
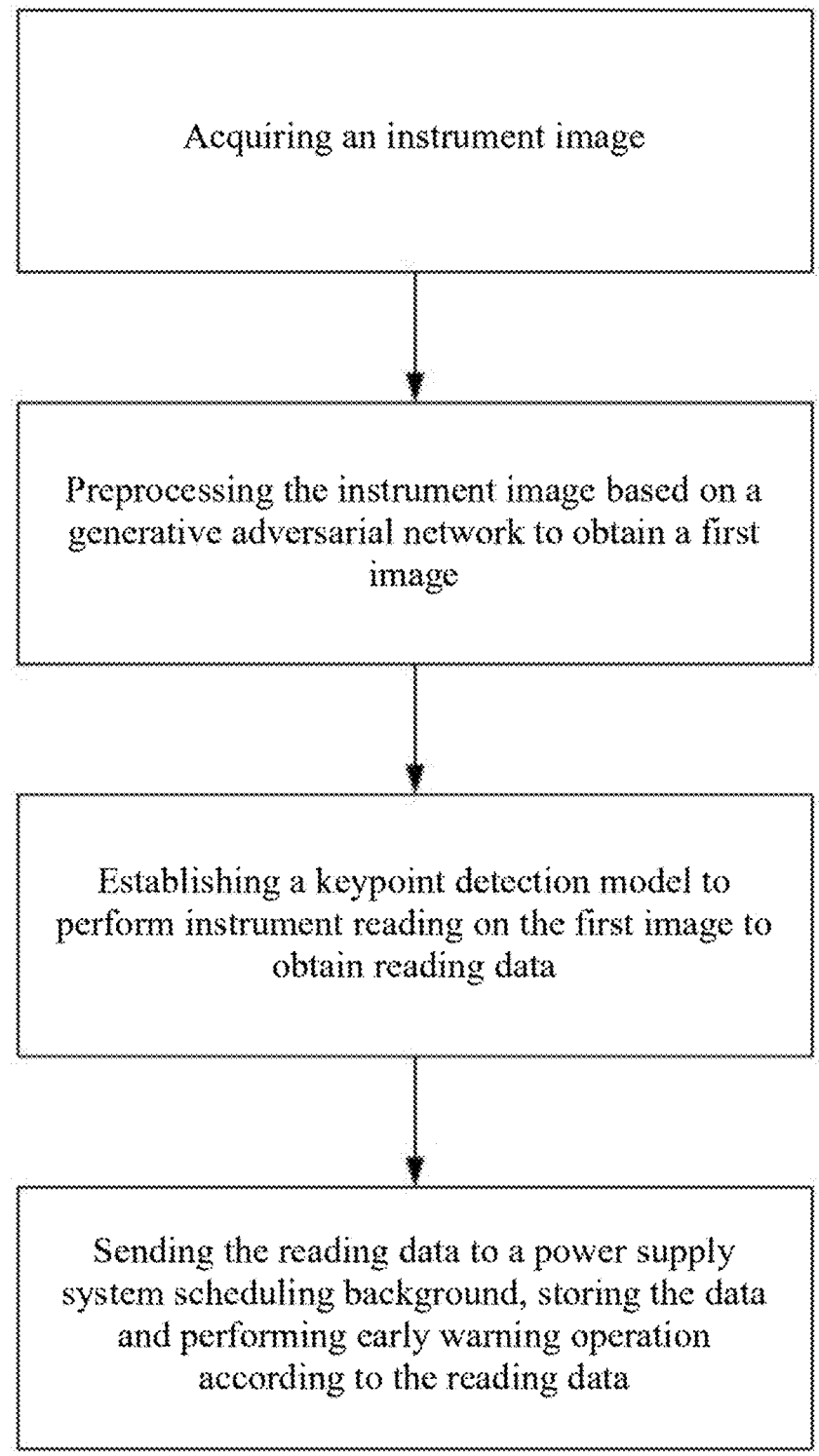
FIG. 1 is a flow chart of a method according to the present invention.

An embodiment of the present invention discloses a method for monitoring GIS instrument sulfur hexafluoride data based on edge computing, as shown in FIG. 1, which includes the following specific steps:

S1: acquiring an instrument image;

S2: preprocessing the instrument image based on a generative adversarial network to obtain a first image;

S3: establishing a keypoint detection model to perform instrument reading on the first image to obtain reading data; and S4: sending the reading data to a power supply system scheduling background, storing the data and performing early warning operation according to the reading data.

Figure 2:
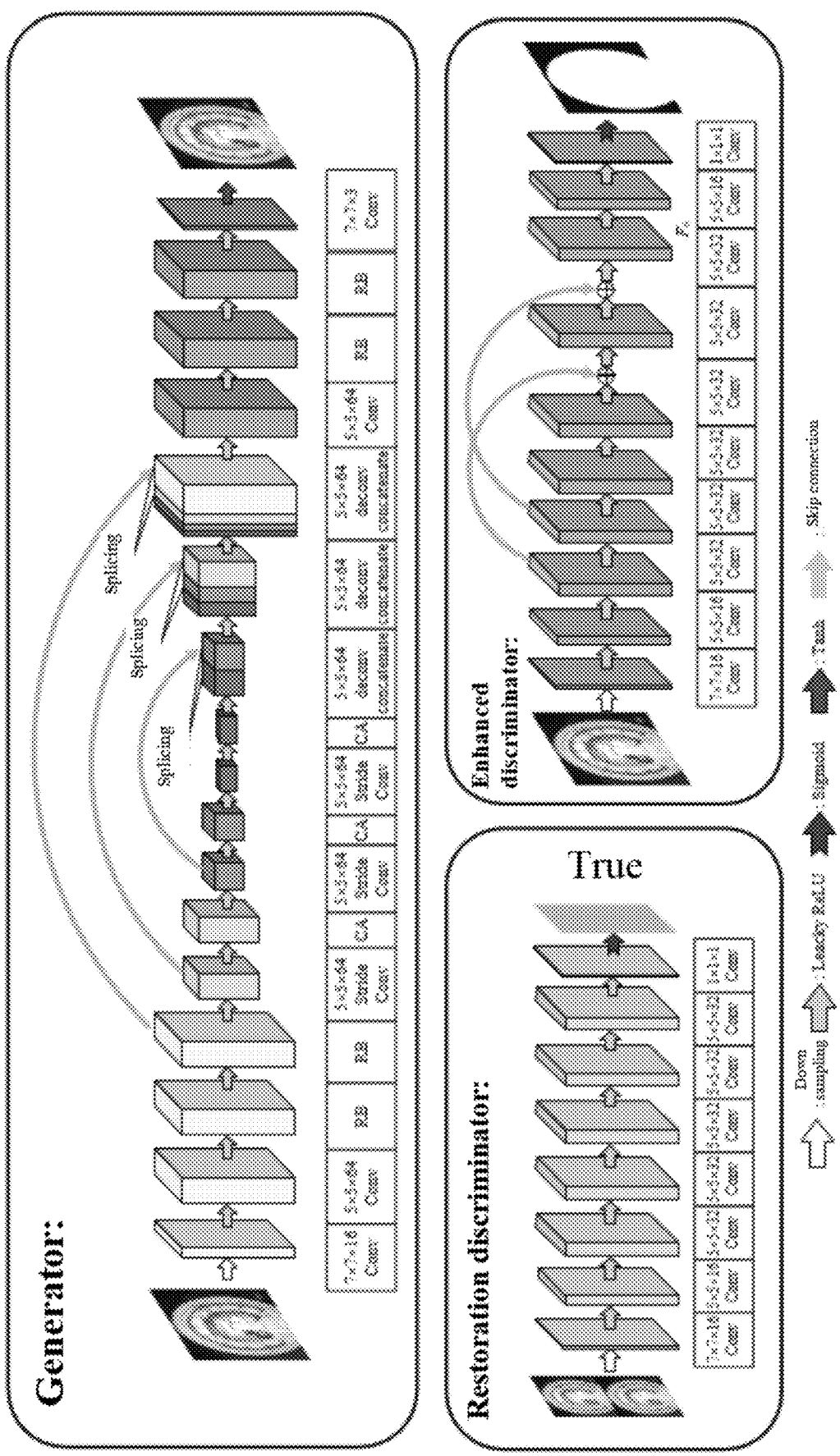
FIG. 2 is a diagram of a structure of a dual generative adversarial network according to the present invention.

Further, a generative adversarial network is an unsupervised learning algorithm and aims to achieve the purpose of image restoration through mutual game of a generator and a discriminator. FIG. 2 shows a diagram of a structure of a dual generative adversarial network that includes a generator and a discriminator. The function of the generator is to enhance an input distorted image and output the enhanced image. In order to achieve this purpose, in the present invention, a 19-layer fully convolutional network is designed, the network includes a convolution layer and a deconvolution layer, up and down sampling is completed through a step length of the convolution layer and the deconvolution layer, and LeakyReLU is used as an activation function of the network; in order to balance semantic information and texture information and generate images with high quality, a network structure similar to U-Net is adopted, and the network structure connects down sampling and up sampling layer by layer through skip connection to establish a network structure in a U shape.

In an initial part of the neural network, a 7×7 large convolution kernel and a residual convolution module are used for extracting features, so that the negative effect caused by too deep network layers can be effectively avoided. Meanwhile, because the fully convolutional network structure is used to solve artifacts that are easily generated in the neural network, inspired by the related research of super-resolution, a channel attention (CA) mechanism is added to the network. In the related research of super-resolution, the channel attention mechanism achieves a good effect. This mechanism is to add a channel attention module to the network, so that the network can give a weight to each channel according to the requirement beneficial to training. A specific implementation is that the feature map generated in the network is processed by global average pooling, and then the weight obtained by two full connection layers is multiplied by a feature map outputted by the network, so that the feature map of each channel is weighted.

Because the target detection method has a poor recognition effect on dense and fine target regions such as instrument scales and pointers, and in the reading process, the image needs to be subjected to perspective transformation additionally, and end-to-end reading cannot be achieved. Therefore, in the present invention, a keypoint detection model is established for a reading task of the pointer instrument by combining an optimization form of multi-channel heat map similarity and a fully convolutional network structure. Through the keypoints of the calibrated instrument image, the keypoint detection network is used to output the coordinates of key feature points, and tasks such as instrument correction, pointer detection and dial projection are completed, and finally the reading calculation of the instrument is completed.

Figure 3:
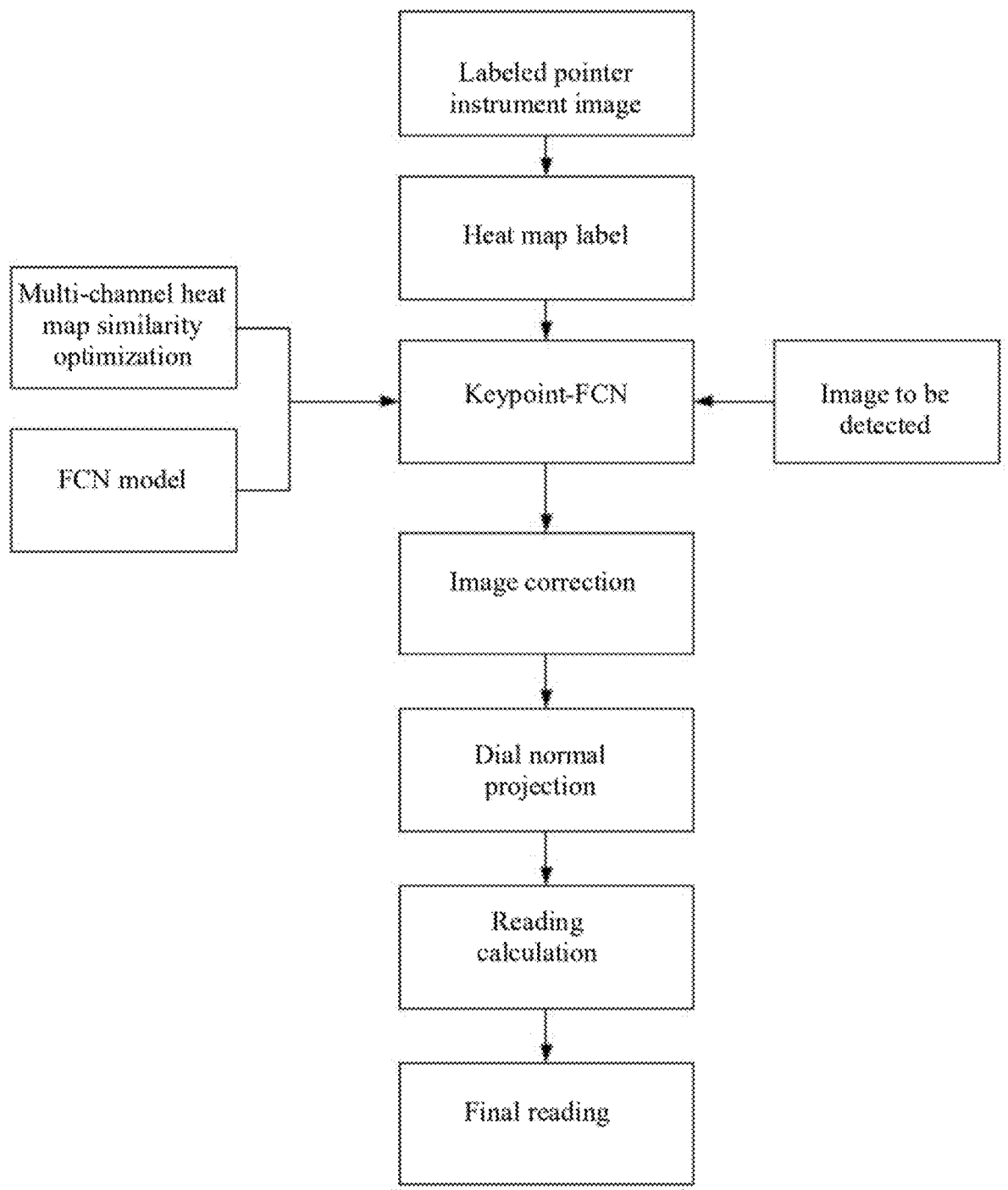
FIG. 3 is a flow chart of a method for performing instrument reading on a first image according to the present invention.

Further, as shown in FIG. 3, the performing instrument reading on the first image by the keypoint detection model includes the following steps:
  selecting a specific scale and a pointer position in the instrument image for calibration;
  converting keypoint coordinates of a labeled pointer instrument image into a corresponding heat map label by a Gaussian kernel function; and
  establishing an improved FCN keypoint detection model by combining an optimization form of multi-channel heat map similarity and a fully convolutional network structure, and detecting an input image.

In the heat map, the color indicates the correlation degree between the pixel point and the labeled pixel point, and the closer to the warm color, the higher the correlation degree. Because the target detection method has a poor recognition effect on dense and fine target regions such as instrument scales and pointers, and in the reading process, the image needs to be subjected to perspective transformation additionally, and end-to-end reading cannot be achieved. Therefore, a keypoint detection model is established for a reading task of the pointer instrument by combining an optimization form of multi-channel heat map similarity and a fully convolutional network structure. Through the keypoints of the calibrated instrument image, the keypoint detection network is used to output the coordinates of key feature points, and tasks such as instrument correction, pointer detection and dial projection are completed, and finally the reading calculation of the instrument is completed.

Furthermore, perspective transformation correction is performed by a known keypoint for a distorted instrument image; and normal projection is performed on the corrected pointer instrument dial image based on the known keypoint, so that a circular dial becomes a rectangular dial region with uniform scales, and reading calculation is performed according to known position coordinates of a pointer.

Further, training the keypoint detection model includes the following steps:
  acquiring an instrument image, randomly extracting a plurality of images for manual labeling, dividing the images into labeled data and unlabeled data, and preventing over-fitting by a supervised loss function;
  performing segmentation mask on the labeled data and the unlabeled data, and extracting information of a dial center, a dial and a pointer; and
  performing reading according to the information of the dial center, the dial and the pointer.

Specifically, for a pointer meter, 120 images are randomly extracted for manual labeling, where 40 images are used a labeled training set, 80 images are used as a test set, and the remaining 1080 images are used as an unlabeled training set in semi-supervised learning, so that the proportion of labeled data under the semi-supervised setting is 40/1120≈3.6%.

For a digital meter, 100 images are randomly extracted for manual labeling, where 50 images are used as a labeled training set, 50 images are used as a test set, and the proportion of labeled data is about 50/150≈33.3%.

For a pointer meter and a digital meter, the maximum number of iteration steps of the model is set to 3000 and 1000, respectively. Considering that there are few labeled training data (40 images in the pointer meter and 50 images in the digital meters), the data sampling strategy of the present invention is to select equal amounts of labeled data and unlabeled data in a batch, and as a result, the labeled data is sampled more times than the unlabeled data, increasing the risk of model over-fitting. For this purpose, an annealing algorithm is used, which gradually weakens a supervised signal of the labeled data. Specifically, the supervised loss is modified to the following form:

$$L_{sup} = \frac{1}{|D_l|} \sum_{x_i^l, y_i \in D_l} \{f(x_i^l) < \tau\}_1 H(f(x_i^l), y_i),$$

where τ is a confidence threshold that is linearly increased from 0.2 to 0.9 in the training process. a number of pixels predicted from class i to class j is denoted as $n_{ij}$, a total number of pixels of category i is denoted as $t_i$, $H(\cdot,\cdot)$ is the CE loss function calculated pixel by pixel, and the supervised loss of a student model $f^s$ is:

$$L_{sup}^A = \frac{1}{|D|} \sum_{x_i^l, y_i \in D_l} H(f^s(x_i^l), y_i).$$

The effect of using this annealing algorithm is to select only difficult pixels for supervised loss calculation. As the training progresses, after the model fully fits the labeled data, the supervised loss almost no longer works, thereby reducing the risk of over-fitting.

There are three possible components in the semantic segmentation mask, namely, a dial center, a dial and a pointer, and some meter types may not have a dial center, but do not affect the final reading. Point fitting is performed on the dial center, and for a scale center, center coordinates of all pixel points in a region to which the scale center belongs are calculated to obtain a geometric center point; ellipse fitting is performed on the dial to fit into an ellipse according to all pixel point coordinates in a region to which the dial belongs, and an intersection of the ellipse and an original region is retained as a scale fitting result; and line fitting is performed on the pointer to fit into a line by a least square method.

Specifically, for a scale center, the center coordinates of all pixel points in a region to which the scale center belongs are directly solved to obtain a geometric center point O; for a dial, an ellipse is fitted according to all pixel point coordinates in a region to which the dial belongs, and an intersection of the ellipse and an original region is retained as a scale fitting result, where two endpoints are set as A and B; for a pointer, a line is fitted by a least square method (if the dial center exists, the point set fitted by the line is also added, and a larger weight is given because the dial center should fall on the line where the pointer is located theoretically), and the intersection point of the line and the ellipse is C. After the extraction of the three basic elements is completed, OA and OB are connected to form an included angle $\alpha_1$, OC is connected to form an included angle $\alpha_2$ with OA, the final reading is:

$$L_{min}+(L_{max}-L_{min}) \cdot R(\alpha_2/\alpha_1),$$

where $L_{min}$ and $L_{max}$ are a minimum scale value and a maximum scale value, respectively. This function $R(\bullet)$ is to convert an angle ratio into a reading ratio. If the scales of the meter are uniform, the function degenerates into identity mapping, and otherwise, the function needs to be configured in advance.

Figure 4:
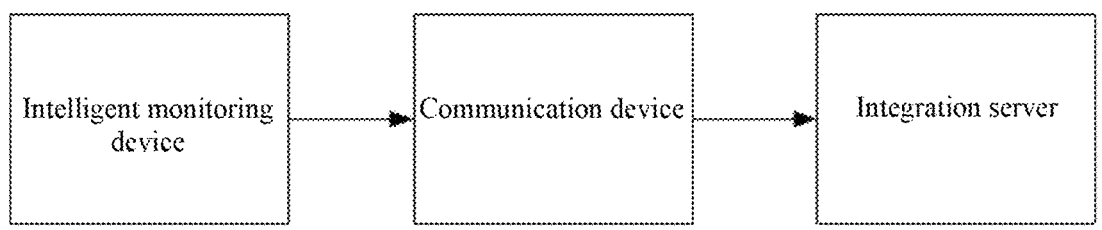
FIG. 4 is a diagram of a structure of a system according to the present invention.

Embodiment 2 of the present invention discloses a system for monitoring GIS instrument sulfur hexafluoride data based on edge computing, which monitors by adopting a method for monitoring GIS instrument $SF_6$ data based on edge computing, and includes an intelligent monitoring device, a communication device and an integration server which are sequentially connected as shown in FIG. 4;
  where the intelligent monitoring device is configured to monitor GIS instrument sulfur hexafluoride data based on edge computing to obtain monitoring data;
  the communication device is configured to transmit the monitoring data to the integration server in real time; and
  and the integration server is configured to receive the monitoring data, store the monitoring data and perform early warning according to the monitoring data.

Further, the intelligent monitoring device includes a camera module, an edge computing chip module, a storage module, a network transmission module and a display module; the camera module, the storage module, the network transmission module and the display module are all connected with the edge computing chip module; and the camera module is configured to photograph an instrument image, the edge computing chip module is configured to perform image processing on the instrument image to obtain reading data, the storage module is configured to store the reading data, the network transmission module is configured to transmit the reading data to the communication device, and the display module is configured to display the reading data.

The intelligent monitoring device is an innovative synthesis device which combines physical quantity information of a GIS combined switch density meter (information acquisition point) with power supply system IEC61850 protocol effective information digital transmission and professional background processing through information flow modes such as timing information acquisition, information perception, information processing and information transmission by advanced information processing hardware and software. The effective digital signals transmitted to a scheduling (controlling) background server can meet the requirements of intelligent monitoring, controlling, application and the like of the real-time state of the GIS combined switch density meter.

This device is practically applied to a 35 kV-220 kV or even 500 kV high-voltage substation GIS equipment and a strong electric field and an outdoor environment, and therefore, special attention should be paid to anti-static (8 kV of standard contact discharge and 16 kV of air discharge of a power grid), anti-strong magnetic interference, waterproof, anti-surge (6 kV of standard common mode and 2 kV of differential mode of a power grid) and other technical performances when developing this device, so that the safety, stability and reliability of the device are ensured.

Figure 5:
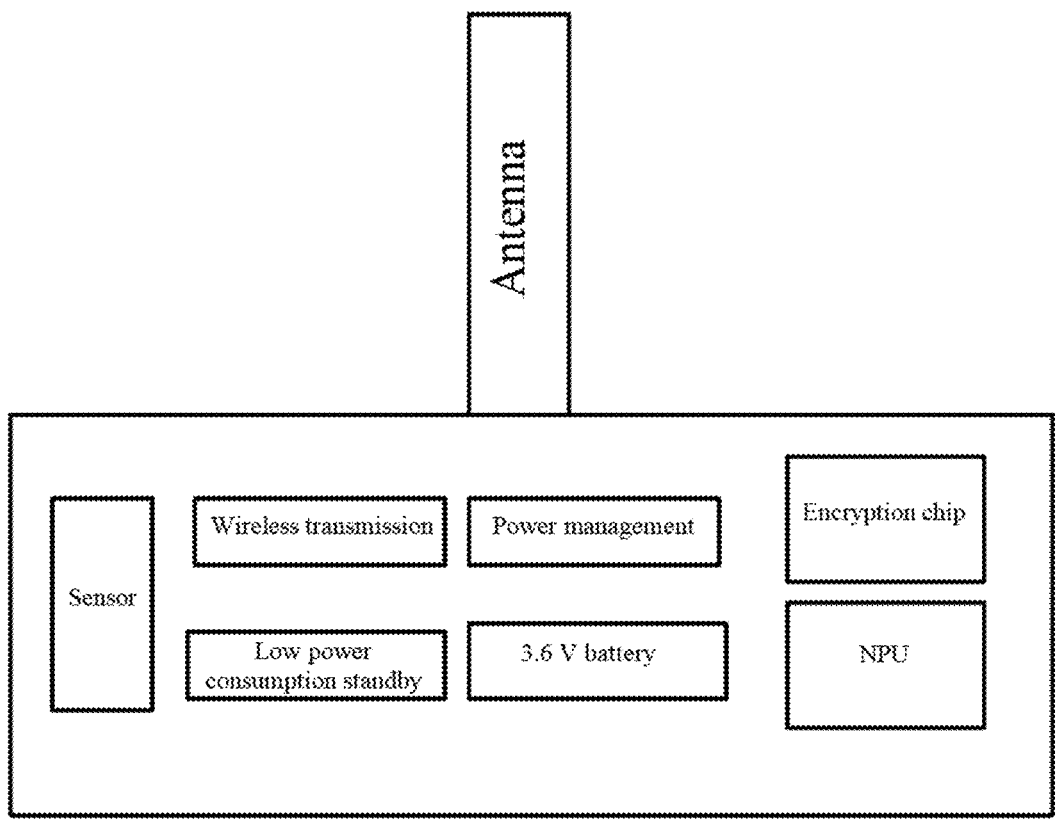
FIG. 5 is a diagram of a structure of a camera module according to the present invention.

As shown in FIG. 5, the camera module is composed of a sensor unit, a wireless transmission unit, a low power consumption standby unit, a power management unit, an antenna unit, an encryption chip unit, an NPU, and a battery.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be readily apparent to those skilled in the art, and the general principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A method for monitoring Gas-insulated switchgear (GIS) instrument $SF_6$ data based on edge computing, comprising the following steps:
  acquiring an instrument image;
  preprocessing the instrument image based on a generative adversarial network to obtain a first image;
  establishing a keypoint detection model to perform instrument reading on the first image to obtain reading data; and
  sending the reading data to a power supply system scheduling background, storing the reading data and performing early warning operation according to the reading data;
  wherein the performing instrument reading on the first image by the keypoint detection model comprises the following steps:

selecting a specific scale and a pointer position in the instrument image for calibration;

converting keypoint coordinates of a labeled pointer instrument image into a corresponding heat map label by a Gaussian kernel function; and establishing an improved Fully Convolutional Networks (FCN) keypoint detection model by combining the heat map label and a fully convolutional network structure, and detecting an input image.

2. The method for monitoring GIS instrument $SF_6$ data based on edge computing according to claim 1, wherein the generative adversarial network comprises a generator and a discriminator; the generator is a 19-layer fully convolutional network that comprises a convolution layer and a deconvolution layer, up and down sampling is performed through a step length of the convolution layer and the deconvolution layer, and LeakyReLU is used as an activation function.

3. The method for monitoring GIS instrument $SF_6$ data based on edge computing according to claim 2, wherein, in the generator, a feature map is extracted by a convolution kernel of 7×7 and a residual convolution module, a channel attention module is added, the feature map is processed by global average pooling, and then a weight obtained by a full connection layer is multiplied by a feature map outputted by the network.

4. The method for monitoring GIS instrument $SF_6$ data based on edge computing according to claim 1, wherein perspective transformation correction is performed by a known keypoint for a distorted instrument image; and normal projection is performed on a corrected pointer instrument dial image based on the known keypoint, so that a circular dial becomes a rectangular dial region with uniform scales, and reading calculation is performed according to known position coordinates of a pointer.

5. The method for monitoring GIS instrument $SF_6$ data based on edge computing according to claim 1, wherein training the keypoint detection model comprises the following steps:

acquiring the instrument image, randomly extracting a plurality of images for manual labeling, dividing the images into labeled data and unlabeled data, and gradually weakening a supervised signal of the labeled data by a supervised loss function of an annealing algorithm, wherein the supervised loss function is:

$$L_{sup} = \frac{1}{|D_l|} \sum_{x_i^l, y_i \in D_l} \{f(x_i^l) < \tau\}_1 H(f(x_i^l), y_i);$$

performing segmentation mask on the labeled data and the unlabeled data, and extracting information of a dial center, a dial and a pointer; and performing reading according to the information of the dial center, the dial and the pointer.

6. The method for monitoring GIS instrument $SF_6$ data based on edge computing according to claim 5, wherein point fitting is performed on the dial center, and for a scale center, center coordinates of all pixel points in a region to which the scale center belongs are calculated to obtain a geometric center point; ellipse fitting is performed on the dial to fit into an ellipse according to all pixel point coordinates in a region to which the dial belongs, and an intersection of the ellipse and an original region is retained as a scale fitting result; and line fitting is performed on the pointer to fit into a line by a least square method.

7. A system for monitoring GIS instrument $SF_6$ data based on edge computing, wherein the system monitors by adopting the method for monitoring GIS instrument $SF_6$ data based on edge computing according to claim 1 for monitoring, and the system comprises an intelligent monitoring device, a communication device and an integration server which are sequentially connected;

wherein the intelligent monitoring device is configured to monitor GIS instrument $SF_6$ data based on edge computing to obtain monitoring data;

the communication device is configured to transmit the monitoring data to the integration server in real time; and the integration server is configured to receive the monitoring data, store the monitoring data and perform early warning according to the monitoring data.

8. The system for monitoring GIS instrument $SF_6$ data based on edge computing according to claim 7, wherein the intelligent monitoring device comprises a camera module, an edge computing chip module, a storage module, a network transmission module and a display module; wherein the camera module, the storage module, the network transmission module and the display module are all connected with the edge computing chip module; and the camera module is configured to photograph the instrument image, the edge computing chip module is configured to perform image processing on the instrument image to obtain the reading data, the storage module is configured to store the reading data, the network transmission module is configured to transmit the reading data to the communication device, and the display module is configured to display the reading data.

9. The system for monitoring GIS instrument $SF_6$ data based on edge computing according to claim 7, wherein the generative adversarial network comprises a generator and a discriminator; the generator is a 19-layer fully convolutional network that comprises a convolution layer and a deconvolution layer, up and down sampling is performed through a step length of the convolution layer and the deconvolution layer, and LeakyReLU is used as an activation function.

10. The system for monitoring GIS instrument $SF_6$ data based on edge computing according to claim 9, wherein, in the generator, a feature map is extracted by a convolution kernel of 7×7 and a residual convolution module, a channel attention module is added, the feature map is processed by global average pooling, and then a weight obtained by a full connection layer is multiplied by a feature map outputted by the network.

11. The system for monitoring GIS instrument $SF_6$ data based on edge computing according to claim 7, wherein perspective transformation correction is performed by a known keypoint for a distorted instrument image; and normal projection is performed on a corrected pointer instrument dial image based on the known keypoint, so that a circular dial becomes a rectangular dial region with uniform scales, and reading calculation is performed according to known position coordinates of a pointer.

12. The system for monitoring GIS instrument $SF_6$ data based on edge computing according to claim 7, wherein training the keypoint detection model comprises the following steps:

acquiring the instrument image, randomly extracting a plurality of images for manual labeling, dividing the images into labeled data and unlabeled data, and gradually weakening a supervised signal of the labeled data by a supervised loss function of an annealing algorithm, wherein the supervised loss function is:

$$L_{sup} = \frac{1}{|D_l|} \sum_{x_i^l, y_i \in D_l} \{f(x_i^l) < \tau\}_1 H(f(x_i^l), y_i);$$

performing segmentation mask on the labeled data and the unlabeled data, and extracting information of a dial center, a dial and a pointer; and performing reading according to the information of the dial center, the dial and the pointer.

13. The system for monitoring GIS instrument $SF_6$ data based on edge computing according to claim 12, wherein point fitting is performed on the dial center, and for a scale center, center coordinates of all pixel points in a region to which the scale center belongs are calculated to obtain a geometric center point; ellipse fitting is performed on the dial to fit into an ellipse according to all pixel point coordinates in a region to which the dial belongs, and an intersection of the ellipse and an original region is retained as a scale fitting result; and line fitting is performed on the pointer to fit into a line by a least square method.

\* \* \* \* \*